L. T. McNEILEY.
Identifying Box.
No. 65,928.                    Patented June 18, 1867.
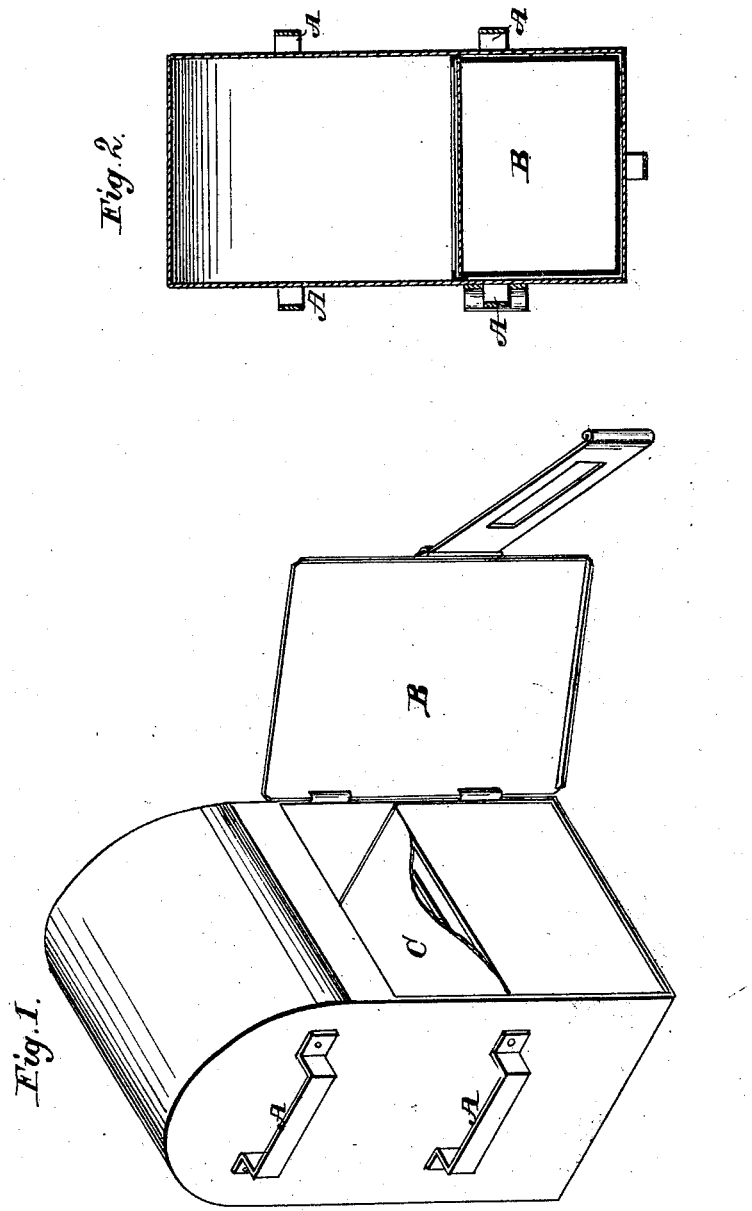
Witnesses:
J. Clement Smith
A. G. Hughams
Inventor,
Levi P. McNeiley
By Chipman Hosmer & Co
Attys.

United States Patent Office.

LEVI T. McNEILEY, OF DANVILLE, MISSOURI.

Letters Patent No. 65,928, dated June 18, 1867.

IDENTIFYING-BOX.

The Schedule referred to in these Letters Patent and making part of the same.

TO ALL WHOM IT MAY CONCERN:

Be it known that I, LEVI T. McNEILEY, of Danville, in the county of Montgomery, and State of Missouri, have invented a new and valuable improvement in Identifying-Boxes; and I hereby declare that the following is a full, clear, and exact description of the construction and operation of the same, reference being had to the annexed drawings, making a part of this specification, and to the letters and figures of reference marked thereon.

The object of my invention is to provide better means than have heretofore been devised for identifying and recovering strayed cattle, horses, sheep, and other domestic animals; also trunks, boxes, and packages that may be lost while being transported. To this end, I construct a box as represented on the drawings, Figure 1, and fasten it by a suitable strap to the neck of an animal, or to the box or package I wish to identify.

Letters A A A A are staples through which the strap passes. B is the door of the box, the fastening strap of which is clasped over a staple, A, and held firmly under the strap by which the box is attached to the animal or package. C is a slide, constructed to fit closely above the lower compartment of the box, so as to make it water-tight. In this lower compartment of the box I place a card, on which is written the name and post-office address of the owner of the animal or package, and the reward that will be paid for the return thereof to him. I sometimes also place in said compartment a stamped envelope, directed to said owner, and a sheet of paper, upon which the finder may write a letter. Upon the frontiers this last device will be found highly beneficial.

What I claim as my invention, and desire to secure by Letters Patent, is—

An identifying-box, constructed substantially in the form herein described, for the purpose of identifying and aiding in the recovering of lost animals and goods.

LEVI T. McNEILEY.

Witnesses:
LAWRENCE H. RIGG,
W. V. RUTLEDGE.